US008712990B2

(12) United States Patent
Ziegler

(10) Patent No.: US 8,712,990 B2
(45) Date of Patent: Apr. 29, 2014

(54) METHODS AND SYSTEMS FOR PROVIDING A BUSINESS REPOSITORY

(75) Inventor: Carsten Ziegler, Walldorf (DE)

(73) Assignee: SAP AG, Walldorf (DE)

( * ) Notice: Subject to any disclaimer, the term of this patent is extended or adjusted under 35 U.S.C. 154(b) by 524 days.

(21) Appl. No.: 12/726,431

(22) Filed: Mar. 18, 2010

(65) Prior Publication Data

US 2011/0087689 A1 Apr. 14, 2011

Related U.S. Application Data

(60) Provisional application No. 61/275,693, filed on Oct. 9, 2009.

(51) Int. Cl.
G06F 17/30 (2006.01)
(52) U.S. Cl.
USPC .......................... 707/707; 707/758; 707/769
(58) Field of Classification Search
USPC .......... 707/999.107, 705, 706, 707, 758, 760, 707/769; 709/224
See application file for complete search history.

(56) References Cited

U.S. PATENT DOCUMENTS

| | | | | |
|---|---|---|---|---|
| 6,609,091 B1* | 8/2003 | Budzinski | ............. | 707/E17.058 |
| 2003/0115322 A1* | 6/2003 | Moriconi et al. | ............. | 709/224 |
| 2008/0091720 A1* | 4/2008 | Klumpp et al. | ............. | 707/104.1 |
| 2009/0254337 A1* | 10/2009 | Sprecher et al. | ................. | 704/9 |

* cited by examiner

Primary Examiner — Vincent F Boccio
(74) Attorney, Agent, or Firm — Finnegan, Henderson, Farabow, Garrett & Dunner, L.L.P.

(57) ABSTRACT

Computer-implemented systems and methods are disclosed for providing a business rule repository in a memory. An exemplary method includes displaying, on a display device, a graphical user interface (GUI) for creating a business rule, and receiving, in a computer, via the GUI user input relating to an input variable of the business rule, and user input relating to an action required by the business rule based on the input variable. The method further includes generating, by the computer, a text document associated with the business rule based on the input, and storing the text document associated with the business rule in the business rule repository.

21 Claims, 10 Drawing Sheets

METHODS AND SYSTEMS FOR PROVIDING A BUSINESS REPOSITORY

CROSS-REFERENCE

This application claims the benefit of priority to U.S. Provisional Application No. 61/275,693, filed Oct. 9, 2009, which is incorporated herein by reference in its entirety.

TECHNICAL FIELD

The disclosure relates generally to the field of business rule-based software applications and, more specifically, to methods and systems for providing a business rule repository.

BACKGROUND INFORMATION

Today, business rules govern the operation of many business enterprises. Business rules may be created based on government or trade regulations, industry standards, and/or specific policies of the individual business enterprises. Accordingly, business rules may be generally defined as logical statements or instructions defining the actions that must be taken in different commercial situations. For example, a simple business rule for an online vendor may require that for each online sale, a receipt for the transaction must be mailed to the customer. A more complex business rule may set forth the types of review required by a financial institution for transactions of different dollar amounts. Accordingly, the overall operation of a business enterprise may be governed on the basis of hundreds, or even thousands, of business rules. Moreover, as circumstances within a business enterprise change, there may be a need to modify existing business rules or create new ones. Thus, business rules are constantly created and modified by authorized personnel within the business enterprise, such as business analysts, policy committees, application developers, or other business users.

Business users create software applications targeted to the specific needs of a business enterprise. For example, a business user may create a loan-processing software application for a financial institution. Such software applications are often referred to as "rule-based applications." The business rules are usually stored in a business rule repository. During execution, the rule-based applications may reference the repository to access certain business rules to complete a particular task.

While creating or editing rule-based applications, the business user may reference the business rule repository to identify a business rule suitable for a particular situation. If the business user does not know specific information about the business rule, however, it may be difficult to identify or locate the business rule in the repository. For example, the repository may be organized alphabetically by business rule name, by business rule catalog or ruleset, by enterprise, or in a variety of other ways. Thus, if the business user does not know the particular name of the business rule, the unique ID of the business rule, the catalog or ruleset to which the business rule belongs, the business or enterprise with which the business rule is associated, the folder in the which the business rule is stored, or other information about how the repository is organized, the business user may have a difficult time finding the right business rule for the job. This may result in inefficiencies in the application development process.

SUMMARY

In view of the above, there is a need for rule-based application developers to quickly and easily identify a business rule suitable for a particular situation without specific knowledge of the business rule or how the business rule repository is organized. This disclosure is directed to addressing one or more of the problems set forth above, as well as other problems in the art.

One aspect of the disclosure is directed to a computer-implemented method for providing a business rule repository in a memory. The method may include displaying, on a display device, a graphical user interface (GUI) for creating a business rule, and receiving, in a computer, via the GUI, user input relating to an input variable of the business rule and user input relating to an action required by the business rule based on the input variable. The method may further include generating, by the computer, a text document associated with the business rule based on the input, and storing the text document associated with the business rule in the business rule repository.

Another aspect of the disclosure is directed to a computer-readable storage medium storing computer program instructions which, when executed by a computer, cause the computer to perform a method for providing a business rule repository in a memory. The method may include displaying, on a display device, a graphical user interlace (GUI) for creating a business rule, and receiving, in a computer, via the GUI, user input relating to an input variable of the business rule and user input relating to an action required by the business rule based on the input variable. The method may further include generating, by the computer, a text document associated with the business rule based on the input, and storing the text document associated with the business rule in the business rule repository.

Yet another aspect of the disclosure is directed to a computer system for providing a business rule repository. The computer system may include a display device, a memory storing the program logic repository, a user input device for receiving input from a user, and a processor. The processor may be configured display, via the display device, a graphical user interface (GUI) for creating a business rule, and to receive, via the input device, user input to the GUI relating to an input variable of the business rule and user input relating to an action required by the business rule based on the input variable. The processor may be further configured to generate a text document associated with the business rule based on the input, and to store the text document associated with the business rule in the business rule repository.

Additional features and advantages will be set forth in part in the description which follows, and in part will be obvious from the description, or may be learned by practice of the embodiments of the invention. For example, the features and advantages may be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, show features of implementations consistent with the present invention and, together with the description, help explain principles associated with the invention. In the drawings.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
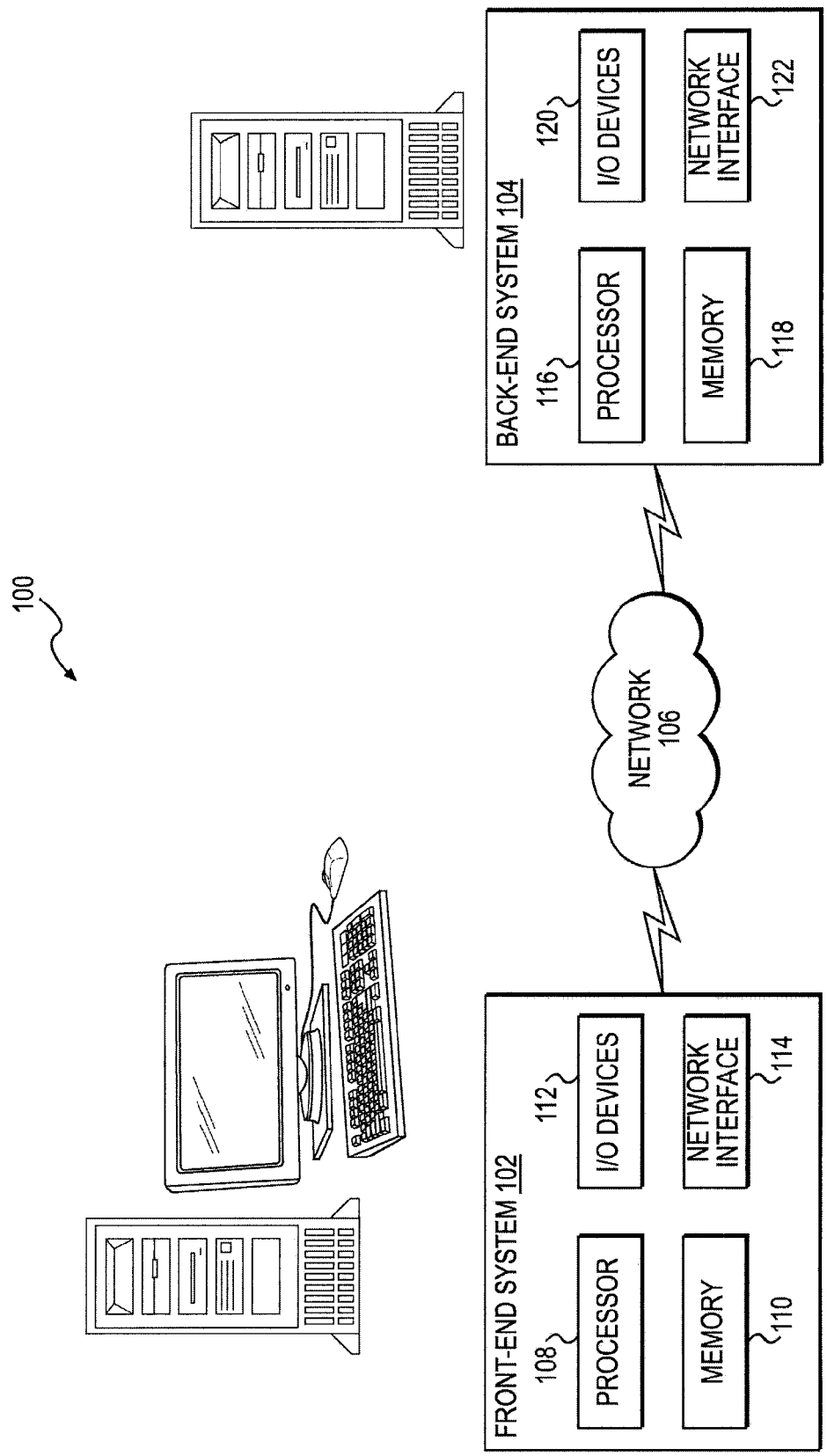
FIG. 1 is a representation of an exemplary business rule application system, consistent with the disclosed embodiments.

FIG. 1 is a representation of an exemplary business rule application system 100, consistent with the disclosed embodiments. System 100 may include a front-end system 102 in communication with a back-end system 104 via a network 106. By way of non-limiting example, front-end system 102 may comprise a workstation, a personal computer, a hand-held computer, a personal digital assistant, a portable navigation device, a mobile phone, and/or another computing device known in the art. Front end system 102 may include, among other things, a processor 108, a memory 110, one or more user input/output devices 112, and a network interface 114 for communicating on network 106.

Processor 108 may comprise one or more computer processors (e.g., a CPU) configured to execute instructions and to process data to perform one or more functions associated with system 100. Processor 108 may include any combination of general-purpose or specially-configured processors configured to perform the disclosed processes.

Memory 110 may comprise one or more memory devices configured to store data. For example, memory 110 may include one or more volatile memory devices, such as random access memory (RAM). Memory 10 may also include one or more non-volatile memory storage devices such as a magnetic disk drive (e.g., a hard drive), an optical disk storage drive (e.g., a CD-ROM drive, a DVD-ROM drive, etc.), programmable read-only memory (PROM), erasable programmable read-only memory (EPROM), electrically erasable programmable read-only memory (EEPROM), a flash drive, a thumb drive, a pen drive, and/or any other non-volatile memory storage device known in the art for storing data. Memory 110 may store, for execution by processor 108, one or more applications or programs for performing the disclosed processes. The programs may be implemented using applets, plug-ins, modules, and/or other software components written in any programming language known in the art (e.g., C++™ or Java™)

Input/output devices 112 may include one or more components configured to allow a user of system 100 to interface with front-end system 102. For example, input/output devices 112 may include user input devices such as a keyboard, a keypad, a mouse, a touch pad, a touch screen, a microphone, an accelerometer, and/or any other user input device known in the art. Input/output devices 112 may also include user output devices such as a display (e.g., an LCD, a CRT display, a plasma display, etc.), a printer, a speaker, and/or any other output device known in the art.

Network interface 114 may comprise any wireless or wired communication device for sending and receiving data on network 106. For example, network interface 114 may include a modem, an Ethernet communication device, a fiber optic communication device, an infrared communication device, a satellite communication device, and/or any other network communication device capable of transmitting and receiving data over network 106.

Back-end system 104, like front-end system 102, may comprise a work station, a personal computer, a mainframe computer, and/or any other computing device known in the art. In one embodiment, back-end system 104 may be a server computer configured to serve or otherwise handle requests from one or more client computers, such as front-end system 102. Like front-end system 102, back-end system 104 may include, among other things, a processor 116, a memory 118, input/output devices 120, and/or a network interface 122 for communicating on network 106. The components of back-end system 104 may be the same as or similar to those discussed above in connection with front-end system 102 and, accordingly, further discussion thereof is omitted.

Back-end system 104 may respond to requests from front-end system 102 received from network 106 in connection with the disclosed business rule processes. It is noted that back-end system 104 may comprise a single server computer or a collection of server computers, alone or in combination with other components. For example, back-end system 104 may be part of a distributed server network (not shown), and may distribute data for parallel processing to one or more additional servers on the distributed server network.

Network 106 may comprise any electronic network capable of carrying information from a source to a destination. For example, network 106 may include, alone or in suitable combination, the Internet, a dedicated or private intranet, a telephony-based network (e.g., PSTN), a local area network (LAN), a wide area network (WAN), a digital subscriber line (DSL), or any other suitable network or network elements. Network 106 may communicate based on Transmission Control Protocol/Internet Protocol (TCP/IP), Hyper Text Transfer Protocol (HTTP), SOAP, Remote Procedure Call (RPC), and/or other suitable communication protocols known in the art.

Figure 2:
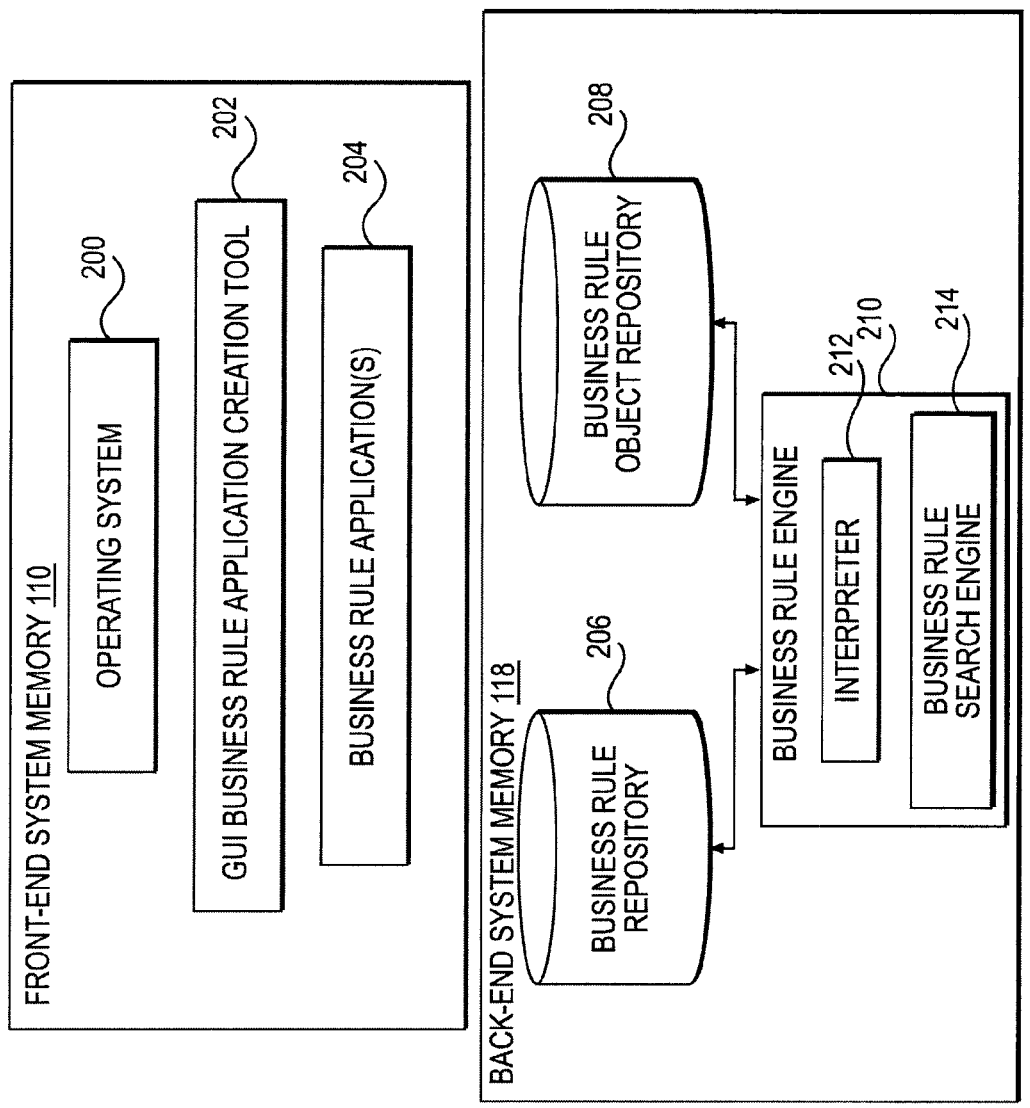
FIG. 2 is a representation of elements that may be stored in memory of the business rule application system of FIG. 1, consistent with the disclosed embodiments.

FIG. 2 is a representation of elements that may be stored in front-end system memory 110 and in back-end system memory 118, consistent with the disclosed embodiments. For example, memory 110 may store, among other things, an operating system 200 (e.g., Microsoft Windows™, MAC OS X™, Unix™, Linux™, DOS™, etc.) supporting a graphical user interface (GUI) business rule application creation tool 202 and a business rule application 204.

During operation, a user of front-end system 102 may use application creation tool 202 to create or modify business rule application 204. Application creation tool 202, described in further detail below, may be a GUI-based software application for creating or modifying business rule application 204. For example, application creation tool 202 may include an interface allowing the user to create or modify graphical representation of a business rule (e.g., in the form of a decision table, a decision tree, a formula, etc.) Application creation tool 202 may also be configured to interpret and convert such GUI representations of business rules into high-level computer language representations (e.g., Advanced Business Application Programming™ (ABAP) developed by SAP AG), C++™, Java™, etc.) of the business rules for storage in business rule repository 206. For example, application creation tool 202 may map the GUI representations of the business rules to previously-developed program code using a high-level computer language, and may output program code representations of the business rules to be processed by business rule application 204 or stored in business rule repository 206.

Business rule application 204 may be a software application tailored to one or more business rules of a particular enterprise. For example, business rule application 204 may be a loan processing application for a financial institution, a customer evaluation application that evaluates customers of a particular business based on a variety of criteria, a financial transaction application that processes financial transactions according to predetermined procedures, or any other application that operates according to one or more predetermined business rules of a business enterprise.

Back-end system memory 118 may store a business rule repository 206, a business rule object repository 208, and a business rule engine 210. Business rule repository 206 may comprise, for example, a database containing a variety of different business rules for use with business rule application 204 or by a business enterprise. In one embodiment, the business rules may be stored as high-level program code for executing the particular functionality of the business rules (e.g., a class).

In addition to the actual program code for the business rules, business rule repository 206 may also contain information describing, classifying, indexing, cataloguing, or otherwise organizing the business rules in a suitable manner. For example, business rule repository 206 may contain an entry for each business rule including metadata specific to the business rule, as discussed below with respect to FIG. 3. In addition, the business rules in business rule repository 206 may be organized (e.g., into folders) based on business rule name, business rule catalog or rule set, business enterprise, or in a variety of other ways.

Business rule object repository 208 may be, for example, a database containing information referenced or required by the business rules. For example, business rule object repository 208 may contain variables, programs, objects, parameters, or other information called or otherwise utilized by the business rules during execution in business rule application 204.

Business rule engine 210 may be a software component that provides a nexus between business rule application 204 and the business rules stored in business rule repository 206. Business rule engine 210 may include, among other things, an interpreter component 212 and a business rule search engine component 214.

Interpreter component 212, for example, in response to a function call from business rule application 204 in connection with executing a particular business rule, may retrieve the business rule (i.e., the program code) stored in business rule repository 206 and the information associated with the particular business rule stored in business rule object repository 208. Interpreter 212 may then execute the retrieved business rule program code based on the corresponding information retrieved from business rule object repository 208, convert the result to a format suitable for business rule application 204, and may return the converted result to business rule application 204 for subsequent processing. In another embodiment, interpreter component 212 may retrieve the relevant business rule program code from business rule repository 206 and any corresponding information from business rule object repository 208, package the retrieved information into a coherent piece of program code (e.g., a program module), and send the program code to business rule application 204 for execution. Alternatively, interpreter 212 may provide the business rule program code and the associated information from business rule object repository 208 to the business rule application 204 for execution.

Business rule search engine 214 may be configured to search business rule repository 206 based on a request received from application creation tool 202 and/or business rule application 204, such as a keyword-based search request. For example, as discussed in further detail below, an application developer may input search criteria into application creation tool 202 to identify a desired business rule in connection with creating or editing business rule application 204. Application creation tool 202 may then send the input search criteria as a search request to business rule search engine 214. Based on the search request, business rule search engine 214 may search business rule repository 206 for business rules relevant to the input search criteria using known search algorithms. Business rule search engine 214 may return the results of the search to application creation tool 202 for subsequent processing, such as for display to the user. The results may be sorted by relevancy or otherwise organized in accordance with known search algorithms. In one embodiment, business rule search engine 214 may be a Web-based search engine operating in a similar manner to Google™, Wikipedia™, or other search engines known in the art. Alternatively, business rule search engine 214 may comprise a proprietary search engine specific to application creation tool 202. Business rule search engine 214 may periodically index the business rules and associated information stored in business rule repository 206 in accordance with known search engine indexing algorithms to facilitate quick and accurate information retrieval.

Figure 3:
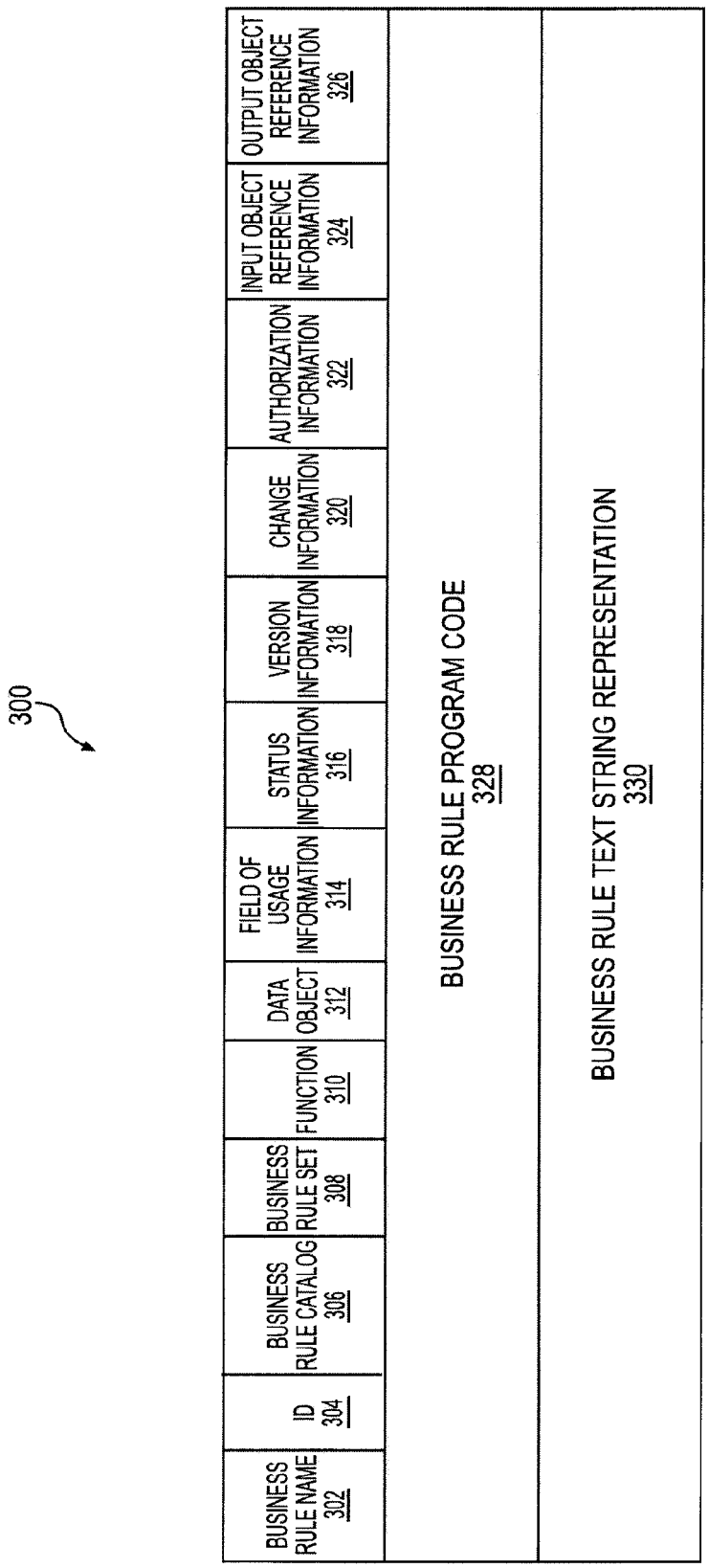
FIG. 3 is a representation of a business rule stored in a business rule repository, consistent with the disclosed embodiments.

FIG. 3 is a representation of an entry for a business rule 300 stored in business rule repository 206. Business rule 300 may comprise a file, a relational database entry, or any other data object known in the art. As shown in FIG. 3, business rule 300 may include metadata corresponding to a name 302, an ID 304, a business rule catalog 306, a business rule set 308, a function 310, a data object 312, field of usage information 314, status information 316, version information 318, change information 320, authorization information 322, input object reference information 324, and output object reference information 326 for the business rule. Business rule 300 may further include program code or logic 328 of business rule 300. In addition, consistent with the disclosed embodiments, business rule 300 may further include a text string representation 330 for business rule 300. As discussed below, text string representations 330 may be used to facilitate quick and accurate searching of business rule repository 206 to identify desired business rules. It is to be appreciated, however, that business rule 300 may contain additional or fewer items for describing, classifying, indexing, cataloguing, identifying or otherwise processing business rule 300 with respect to other business rules.

Business rule name 302 may include metadata containing a name of business rule 300. For example, a business rule relating to checking a loan applicant's credit may have a business rule name 302 "Loan Credit Check." In another example, a business rule relating to a minimum allowable credit card transaction amount may have a business rule name 302 "Credit Card Transaction Minimum."

ID 304 may include metadata containing an identifier or key (e.g., a serial number) that identifies business rule 300. For example, business rule 300 may have and ID 304 of "123456."

Business rule catalog 306 may include metadata containing the name or other ID of a "catalog" to which business rule 300 belongs. A catalog may be a collection of business rules having a common theme or feature. A catalog may also include other business objects besides business rules. For example, business rule 300 may belong to a catalog associated with a particular business entity that uses business rule 300 (e.g., XYZ Corp.), an industry to which business rule 300 applies (e.g., insurance or banking), and/or any other suitable criteria.

Business rule set 308 may include metadata containing the name or another ID of a "rule set" to which business rule 300 belongs. Like a catalog, a rule set may refer to a collection of business rules having a common theme or common features. In one embodiment, however, a rule set may have a narrower scope than a catalog and, therefore, may encompass fewer business rules than a catalog. For example, business rule 300 may belong to a rule set associated with a particular application or topic (e.g., loan application processing, insurance claim processing, etc.).

Function 310 may include metadata indicating the "entry point" for execution of business rule 300. It is to be appreciated that a business rule may not be a standalone object capable of independent execution in a meaningful way. Rather, a business rule may be a elemental step or rule within the context of a business enterprise's overall operation. Accordingly, a business rule may be incorporated into another object or program module that utilizes the business rule within a greater overall purpose or strategy of the business enterprise. To that end, function 310 may indicate the names of one or more functions or other objects that include, execute, or otherwise utilize business rule 300.

Figure 4:
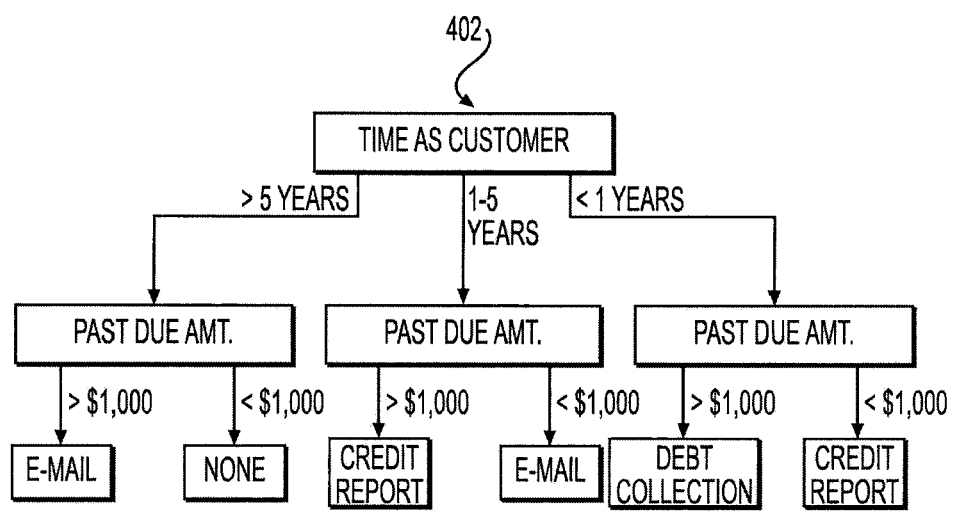
FIG. 4 is a representation of various business rule formats, consistent with the disclosed embodiments.

Data object 312 may include metadata indicating the variable or type definition of business rule 300. That is, data object 312 may list the name of the variable type or definition of business rule 300. It is to be appreciated that the variable types or names may vary depending upon the particular programming language used. Data object 312 may alternatively or additionally indicate a particular type of graphical representation of the business rule for use in connection with application creation tool 202. Exemplary graphical representations of a business rule include a decision table, a decision tree, or a formula. FIG. 4 illustrates exemplary representations of business rules in the form of a decision table 400, a decision tree 402, and a formula 404.

A business rule in the form of a decision table 400 may be represented by a list of decisions or results and the conditions on which the decisions or results are based. For example, the business rule represented by the illustrated decision table 400 may pertain to the type of review required for a financial transaction associated with a particular business enterprise. As shown, decision table 402 may include a "review type" column indicating the level of review required (e.g., no review, review by a manager of the company, or review by an officer of the company) for a particular transaction. The particular type of review required may be based on information indicated in a "transaction amount" (e.g., a dollar amount) column and a "transaction type" (e.g., an internal transaction or an external transaction) column. For example, according to the illustrated business rule, a transaction of $1,200 into or out of the business enterprise must be reviewed by an officer of the company.

Decision tree 402 represents a business rule in the form of a flowchart or graph of decisions and possible results. The business rule represented by the exemplary illustrated decision tree 402 may select a method of handling a past due customer based on the length of time as a customer and the past due amount. In the example illustrated, the first decision determines how long the customer has been a customer (e.g., less than 1 year, 1-5 years, or more than 5 years). This first decision is followed by a second decision determining the past due amount. As shown, the manner in which the customer is treated varies depending on the amount of time as a customer and the past due amount. For example, a customer of less than 1 year with a past due amount of more than $1,200 may be sent to debt collection, whereas a customer of 3 years with the same past due amount may be reported to a credit agency.

As mentioned above, a business rule may also be modeled as a formula 404, such as a mathematical expression, a Boolean expression, or another type of expression of different variables. The business rule represented by the illustrated formula 404 may calculate the sale price of a good in a specific locality by factoring in a locality tax (e.g., 20%) and a locality service charge (e.g., $1.25).

Returning to FIG. 3, field of usage information 314 may include metadata indicating the industry or field of use of business rule 300. For example, a business rule 300 relating to checking a loan applicant's credit or a minimum allowable credit card transaction amount may indicate "financial" or "banking" in field of usage information 314. In another example, a business rule 300 for determining whether an insurance adjuster's estimate has been approved before authorizing payment to the customer may indicate "insurance" in field of usage information 314.

Status information 316 may include metadata indicating a current status of business rule 300. For example, business rule 300 may have a status 316 of "active" or "inactive," depending upon whether business rule 300 is currently used by a business enterprise. It is to be appreciated that other suitable status indicators for business rule 300 may be used. For example, a proposed business rule that has not yet been adopted by the business enterprise may have a status 316 of "proposed."

Version information 318 may include metadata indicating a version of business rule 300. For example, the second version of a particular business rule 300 may indicate "Version 2" or "Version B" in version information 318. Change information 320 may include metadata indicating the time and date on which business rule 300 was created and/or last updated by an application developer.

Authorization information 322 may include metadata indicating a level of authorization required to access or otherwise use business rule 300. It is to be appreciated that some business rules may incorporate or utilize confidential or sensitive information of the enterprise. Depending upon the confidentiality or sensitivity of business rule 300, or any information contained in or otherwise associated with business rule 300, authorization information 322 may indicate "green," "yellow," "red," or some other level of sensitivity or confidentiality of business rule 300. In other embodiments, authorization information 322 may indicate a minimum employee level in the enterprise hierarchy having authorization to access business rule 300 (e.g., "application manager," "project manager," "CEO," etc.).

Input object reference information 324 may include metadata indentifying other objects, business rules, attributes, routines, or parameters required by business rule 300 as input or on which business rule 300 otherwise operates. For example, input object reference information 324 may identify the name or other ID of objects stored in business rule object repository 208 and called by business rule 300 during execution of business rule application 204. In the example of the business rule illustrated by decision table 400 of FIG. 4, input object reference information 324 may indicate "transaction amount" and "transaction type" as objects on which the business rule operates.

Similarly, output object reference information 326 may include metadata indentifying objects or parameters that business rule 300 provides as output or as a result. Thus, taken together, input and output object reference information 324 and 326 may identify the input and output space of business rule 300. Accordingly, based on input and output object reference information 324 and 326, an application developer may be able to determine the context of business rule 300 within an overall business rule set. For example, output object reference information 326 for the business rule illustrated by decision table 400 of FIG. 4 may indicate "review type" as an output or result of the business rule.

Business rule program code 328 may comprise the actual program code for implementing business rule 300. That is, program code 328 may contain the specific high-level computer program syntax (e.g., C++, Java, etc.) for allowing business rule application 203 to execute business rule 300. Business rule program code 328 may comprise, for example, a class, an object, a subroutine, or any other type of program logic component known in the art.

Text string representation 330 may comprise a text string representation of business rule 300 for use in a keyword search to identify business rule 300 in business rule repository 206. For example, text string representation 330 may be obtained by running the "TO_STRING( )" function of C++, Java, or another programming language, on certain attribute information associated with business rule 300, as discussed below. Text string representation 300 may comprise an Extensible Markup Language (XML) document, a Hypertext Markup Language (HTML) document, a Generalized Markup Language (GML) document, a text (TXT) document, or any other type of text document known in the art. In one embodiment, text string representation 330 may comprise a marked-up text document containing certain attribute information associated with business rule 300.

Figure 5:
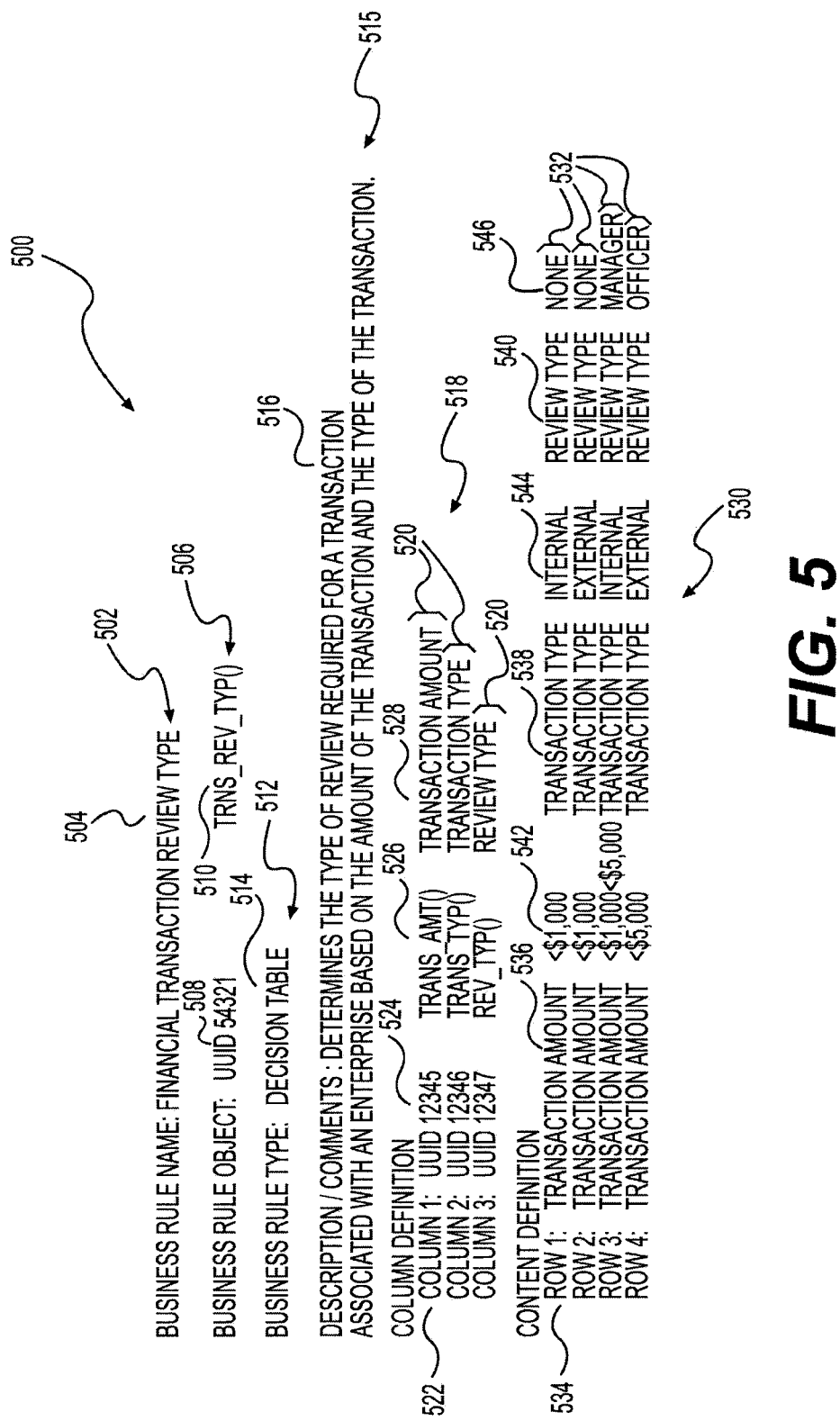
FIG. 5 is a representation of an exemplary text string representation of a business rule based on a decision table, consistent with the disclosed embodiments.
Figure 6:
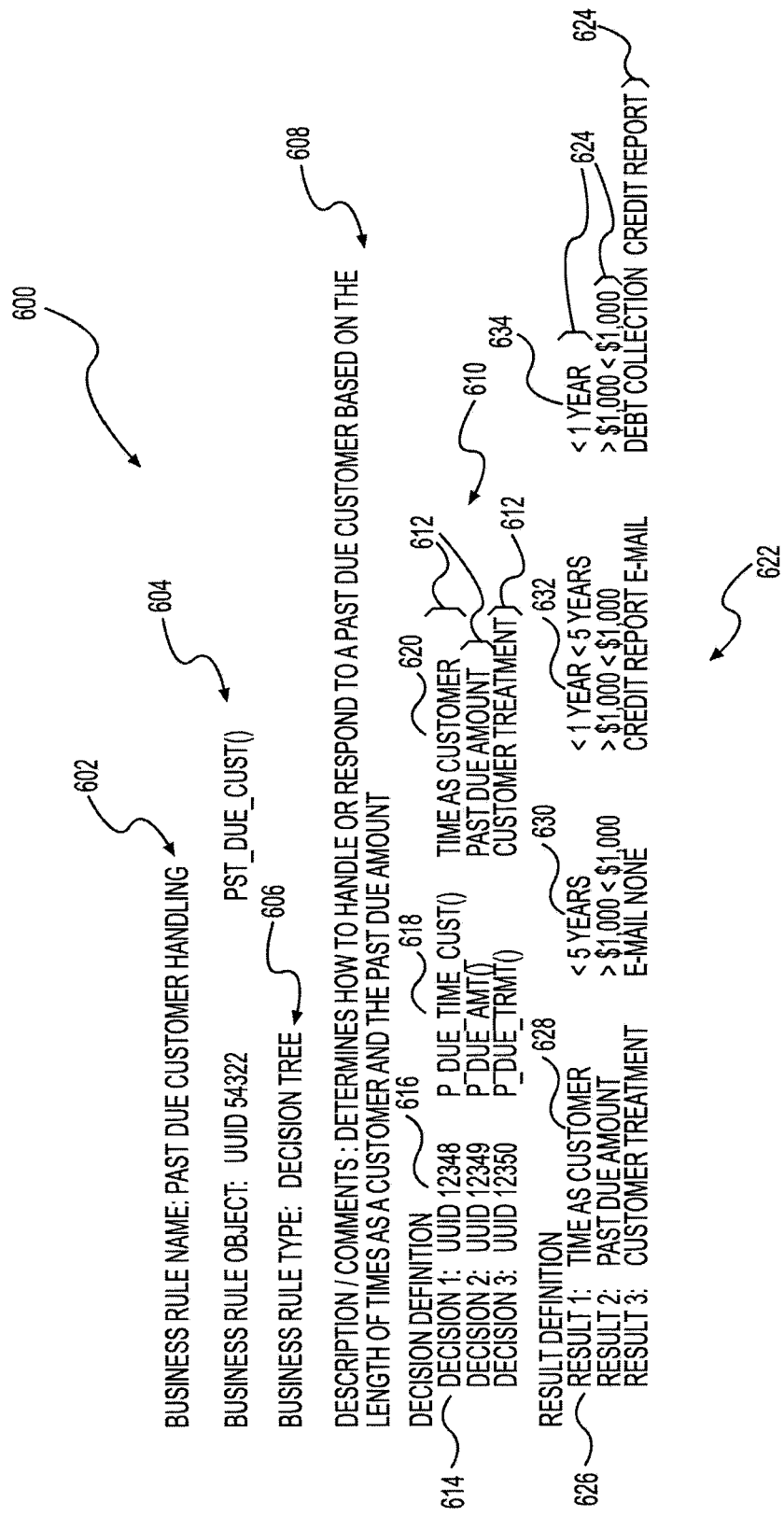
FIG. 6 is a representation of an exemplary text string representation of a business rule based on a decision tree, consistent with the disclosed embodiments.
Figure 7:
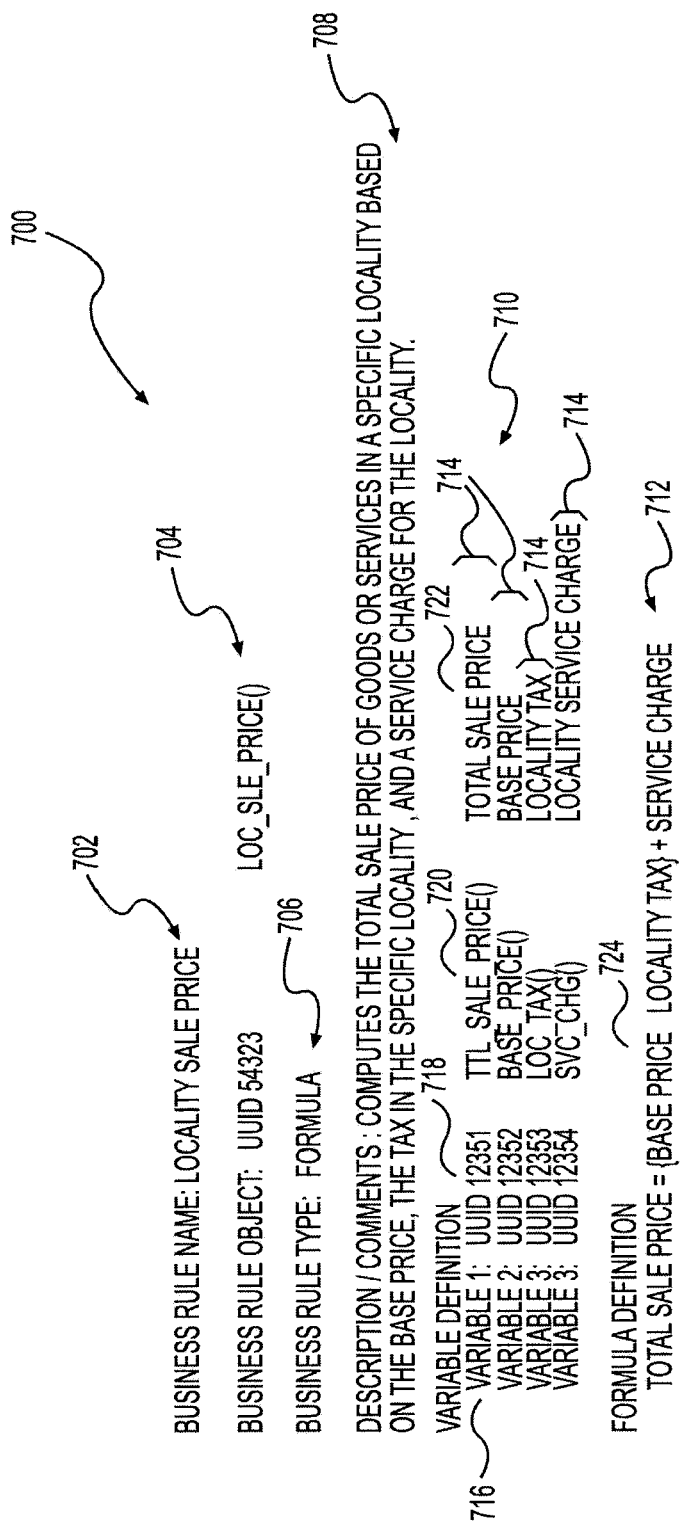
FIG. 7 is a representation of an exemplary text string representation of a business rule based on a formula, consistent with the disclosed embodiments.

FIGS. 5-7 illustrate exemplary text string representations of business rules, consistent with the disclosed embodiments. In particular, FIG. 5 shows an exemplary text string representation 500 of the business rule represented by decision table 400 of FIG. 4, discussed above; FIG. 6 shows an exemplary text string representation 600 of the business rule represented by the decision tree 402 of FIG. 4, discussed above; and FIG. 7 shows an exemplary text string representation 700 of the business rule represented by the formula 404 of FIG. 4, discussed above.

As shown in FIG. 5, text string representation 500 may indicate a name 502 of the business rule. Business rule name 502 may include, for example, a plain language text string name 504 of the business rule (e.g., "Financial Transaction Review Type"). Text string representation 500 may also indicate a business rule object 506 associated with the particular business rule. In one embodiment, business rule object 506 may include a Universally Unique Identifier (UUID) 508 of a data object, such as a class or other program logic component contained in business rule repository 206, for implementing the functionality of the business rule. In addition, business rule object 506 may indicate a name 510 (e.g., "TRNS_REV_TYP( )") of the data object for implementing the functionality of the business rule.

Text string representation 500 may also indicate a type 512 of the business rule. As shown, business rule type 512 may include a text description 514 of the particular type of the business rule. As discussed above, a business rule may be graphically represented as a decision table, a decision tree, a formula, or in other ways. As text string representation 500 corresponds to the business rule represented by the decision table 400 of FIG. 4, business rule type 512 may accordingly indicate "Decision Table," as shown in FIG. 5. Text string representation 500 may further include a description 515 or comments associated with the business rule. In one embodiment, description 515 may include a text description 516 of the functionality of the business rule, or other comments or documentation associated with the business rule.

Text string representation 500 may further include a column definition section 518 providing definitions of the various columns of the business rule represented by the decision table 400 of FIG. 4. As indicated above, decision table 400 includes columns associated with the different variables ("Transaction Amount," "Transaction Type," and "Review Type") upon which the business rule acts. These variables may correspond to certain data objects, such as classes, routines, or other program logic elements contained in business rule object repository 208. In one embodiment, column definition section 518 may include a definition 520 for each column of decision table 400.

As shown, each column definition 520 may include a column identifier 522 (e.g., "Column 1," "Column 2," and "Column 3") indentifying a respective column of decision table 400. Column definition 520 may further include a UUID 524 of the data object corresponding to the variable associated with the respective column of decision table 400. In addition, column definition 520 may include a name 526 of the data object corresponding to the variable associated with the respective column of decision table 400. Column definition 520 may additionally include a plain text name 528 of the variable associated with the respective column of decision table 400. It is noted that the information of column definition section 518 may be generated, for example, by application creation tool 202, in connection with developing or modifying business rule application 204, as discussed below.

Still further, text string representation 500 may include a content definition section 530 defining the actual content of the various cells of decision table 400. In one embodiment, content definition section 530 may include a definition 532 for each row of decision table 400. Each row definition 532 may include a row identifier 534 (e.g., "Row 1," "Row 2," "Row 3," and "Row 4") identifying a respective row of decision table 400. Row definition 532 may further include plain text names 536-540 of the respective variables associated with each cell of that row of decision table 400, which may correspond to columns of decision table 400. For example, as shown in FIG. 4, the cells of the rows of decision table 400 correspond to the variables "Transaction Amount," "Transaction Type," and "Review Type." Accordingly, as shown in FIG. 5, text names 536-540 for the cells may respectively indicate "Transaction Amount," "Transaction Type," and "Review Type."

Row definition 532 may also include respective cell content information 542-546 for each cell of each row of decision table 400. In one embodiment, cell content information 542-546 may include the actual text contained in the respective cells of decision table 400. For example, as shown in FIG. 4, the first cell in the first row of decision table 400 indicates transaction amounts greater than $0 but less than $1,000. Accordingly, cell content information 542 for this cell may indicate, for example, "$0>$1,000," or another textual representation of values between $0 and $1,000. Similarly, the second and third cells in the first row of decision table 400 indicate "Internal" as a transaction type and "None" as a review type. Accordingly, cell content information 544 and 546 for these particular cells may indicate "Internal" and "None," respectively. The remaining row definitions 532 may similarly include information based on the information associated with the respective rows of decision table 400. It is noted that the information of content definition section 530 may be generated, for example, by application creation tool 202, in connection with developing or modifying business rule application 204, as discussed below.

FIG. 6 shows an exemplary text string representation 600 of the business rule represented by the decision tree 402 of FIG. 4. Text string representation 600 may be similar to text string representation 500, and may indicate a business rule name 602, a business rule object 604, a business rule type 606 (e.g., "Decision Tree"), and a business rule description 608, similar to string representation 500 discussed above. However, as text string representation 600 relates to decision tree 402 rather than decision table 400, text string representation 600 may include a decision definition section 610 instead of a column definition section, for example.

Decision definition section 610 may provide definitions of the various decisions associated with the decision tree 402 of FIG. 4. As indicated above, decision tree 402 includes a first decision relating to how long the customer has been a customer, a second decision relating to the past due dollar amount of the customer, and a third decision relating to how to treat the past due customer based on this information. In one embodiment, the decisions may correspond to certain data objects, such as classes, routines, or other program logic elements contained in business rule object repository 208.

As shown in FIG. 6, decision definition section 610 may include definitions 612 for each decision of the decision tree 402. Each decision definition 612 may include a decision identifier 614 (e.g., "Decision 1," "Decision 2," and "Decision 3") indentifying a respective decision of decision tree 402. Decision definition 612 may further include a UUID 616 of the data object corresponding to the variable associated with the respective decision of decision tree 402. In addition, decision definition 612 may include a name 618 (e.g., "P_DUE_TIME_CUST( )") of the data object corresponding to the variable associated with the respective decision of decision tree 402. Decision definition 612 may additionally include a plain text name 620 (e.g., "Time as Customer") of the variable (or data object) associated with the respective decision of decision tree 402. It is noted that the information of decision definition section 610 may be generated, for example, by application creation tool 202, in connection with developing or modifying business rule application 204, as discussed below.

Still further, text string representation 600 may include a result definition section 622 defining the possible results (i.e., "branches") of the various decisions of decision tree 402. In one embodiment, result definition section 622 may include definitions 624 of the possible results of the decisions of decision tree 402. Each result definition 624 may include a result identifier 626 (e.g., "Result 1," "Result 2," and "Result 3") indentifying a result of a respective decision of decision tree 402. Result definition 624 may further include a plain text name 628 (e.g., "Time as Customer") of the variable (or data object) associated with the respective result of decision tree 402.

Result definition 624 may also include respective result content information 630-634 for the possible results of the respective decisions of decision tree 402. In one embodiment, result content information 630 may include text describing the possible results of the respective decision of decision tree 402. For example, as shown in FIG. 4, the possible results of the first decision ("Time as a Customer") of decision tree 402 include more than 5 years, 1-5 years, and less than 1 year. Accordingly, as shown in FIG. 6, result content information 630-634 for this decision may respectively indicate, for example, "<5 years," "<1 year<5 years," and "<1 year." It is appreciated that result content information 630-634 may be indicated in any other suitable way, such as "less than 5 years," "between 1 and 5 years," and "less than 1 year." The result content information 630-634 for the remaining decisions (i.e., result definitions 624) of decision tree 412 may be indicated in a similar manner.

FIG. 7 shows an exemplary text string representation 700 of the business rule represented by the formula 404 of FIG. 4. Text string representation 700 may be similar to text string representations 500 and 600, and may indicate a business rule name 702, a business rule object 704, a business rule type 706 (e.g., "Formula"), and a business rule description 708, as discussed above in connection with text string representations 500 and 600. However, as text string representation 700 relates to a formula 404, text string representation 700 may include a variable definition section 710 and a formula definition section 712.

Variable definition section 710 may provide definitions of the variables of the formula 404 of FIG. 4. As indicated above, formula 404 may calculate the sale price of a good in a specific locality by factoring in a locality tax (e.g., 20%) and a locality service charge (e.g., $1.25). In one embodiment, the particular variables of formula 404 may correspond to certain data objects, such as classes, routines, or other program logic elements, contained in business rule object repository 208.

As shown in FIG. 7, variable definition section 710 may include definitions 714 for the variables of formula 404. Each variable definition 714 may include a variable identifier 716 (e.g., "Variable 1," "Variable 2," and "Variable 3") indentifying a different variable of formula 404. Variable definition 714 may further include a UUID 718 of the data object corresponding to the respective variable of formula 404. In addition, each variable definition 714 may include a name 720 (e.g., "TTL_SALE_PRICE( )") of the data object corresponding to the respective variable of formula 404. Variable definition 714 may additionally include a plain text name 722 (e.g., "Total Sale Price") of the respective variable (or data object) of formula 404. Formula definition section 712 may include a text string 724 of formula 404. It is noted that the information of text string representation 700 may be provided by a business user or an application developer in connection with developing or modifying business rule application 204, as discussed below.

The disclosed configurations of text string representations 500-700 may advantageously facilitate a keyword-based search engine allowing a business user or application developer to quickly and easily identify a desired business rule 300. By searching text string representations 500-700 of business rules, rather than program code or other technical information associated with the business rules that does not lend itself to intuitive keyword searching, the disclosed embodiment may provide improved business rule searching capabilities.

Moreover, one of ordinary skill in the art will understand that additional or different attribute information may be included in text string representations 500-700, if desired. For example, text string representations 500-700 may further include attribute information identifying a user that created or edited the business rule, a time at which the business rule was created or last modified, or any other desired information about the business rule. Accordingly, the specific examples provided of attribute information contained in text string representations 500-700 are intended to be illustrative rather than limiting in any way.

Figure 8:
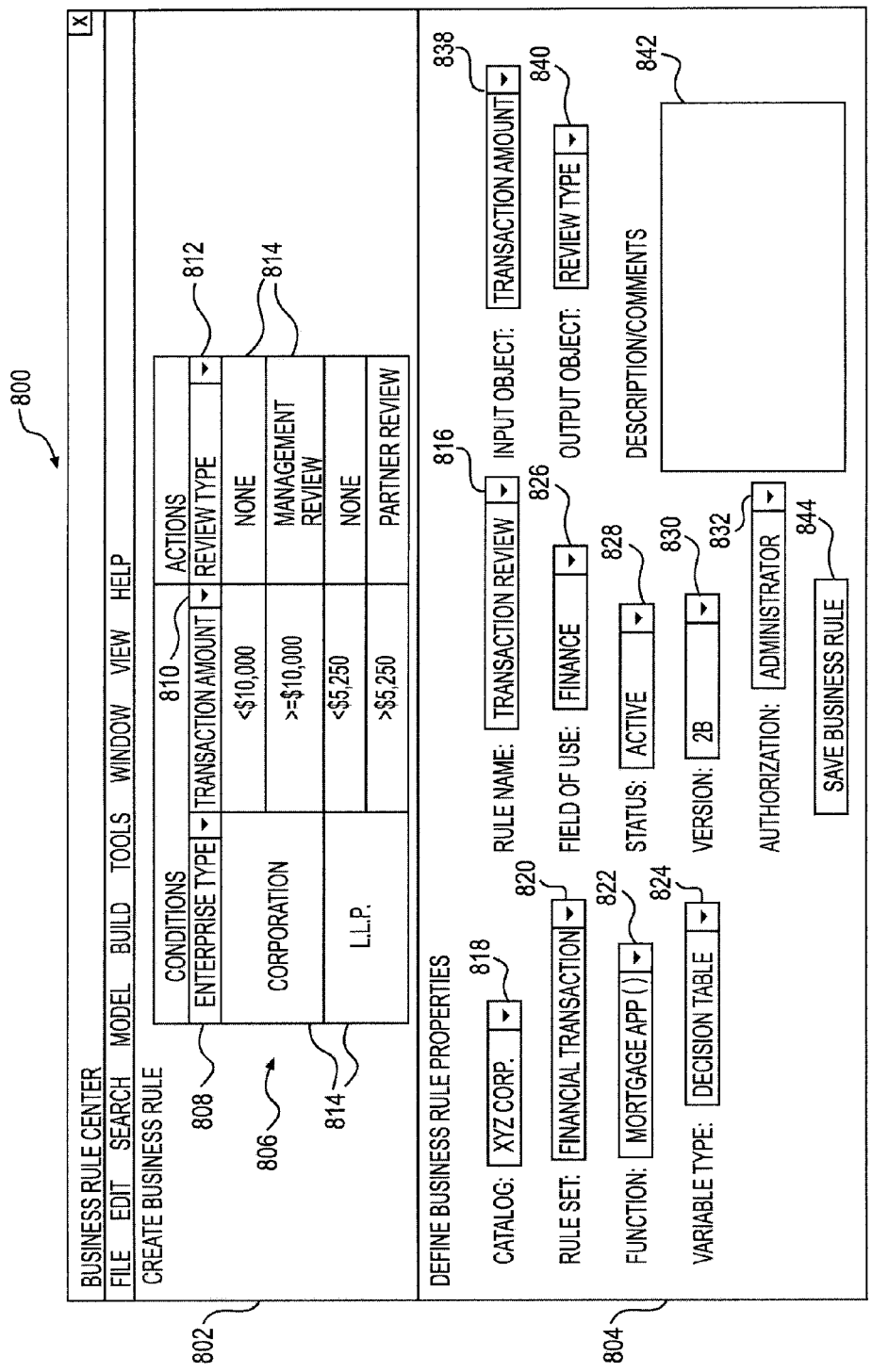
FIG. 8 is a representation of an exemplary graphical user interface (GUI) for creating a business rule, consistent with the disclosed embodiments.

FIG. 8 is a representation of an exemplary business rule creation graphical user interface (GUI) 800 associated with application creation tool 202, consistent with the disclosed embodiments. GUI 800 may be displayed on a display device to a user of front-end system 102 during execution of application creation tool 202. As illustrated, business rule GUI 800 may include, among other things, a business rule creation window 802 and a business rule property definition window 804.

Business rule creation window 802 may allow a business user or application developer to graphically create and/or edit business rules for use in business rule application 204. In one embodiment, business rule creation window 802 may include, for example, a business rule decision table interface 806 for creating or editing business rules. It is to be appreciated, however, that business rule creation window 802 may alternatively additionally include other types of user interfaces (not shown) for creating or editing business rules. For example, business rule creation window 802 may include a decision tree user interface (not shown) for creating or editing a business rule based on a decision tree, a formula user interface (not shown) for creating or editing a business rule based on a formula, a text editor for inputting program code to create a business rule, and/or any other type of user interface for creating or editing a business rule.

In the example of FIG. 8, decision table interface 806 depicts a business rule for determining whether a financial transaction for a particular type of enterprise must be reviewed before the transaction can be completed and, if so, what type of review is required. The depicted business rule, however, is intended to be illustrative rather than limiting in any way, as business rule creation window 802 may be used to create or edit any type of business rule. Moreover, while the example of FIG. 8 shows the business rule as having only three columns: two columns associated with input conditions, and one column associated with the action performed based on the input conditions, it is to be appreciated that a business rule may have any number of input conditions and actions taken when the input conditions are satisfied. For example, a complex business rule may have many input conditions and many possible output actions performed or required depending upon the input conditions. Accordingly, decision table interface 806 may allow the user to add columns for additional input conditions and/or results associated with a business rule.

As shown in FIG. 8, decision table interface 806 may include one or more input condition user interface elements 808 and 810 for selecting variables (e.g., corresponding to data objects in business rule object repository 208) associated with input conditions for the business rule. Decision table interface 806 may further include a result user interface element 812 for selecting a variable (e.g., corresponding to a data object in business rule object repository 208) associated with an action or result required by the business rule when the input conditions are satisfied. User interface elements 808-812 may comprise, for example, drop-down menus, text entry areas, or any other user interface elements known in the art. In the example illustrated, the user may select or otherwise input the variable "Enterprise Type" via user interface element 808, as a first input condition for the business rule, and may select or otherwise input the variable "Transaction Amount" via user interface element 810, as a second input condition for the business rule. In one embodiment, the variables "Enterprise Type" and "Transaction Amount" may be associated with respective data objects (e.g., "Enter_Typ( )" and "Trans_Amt( )") or other program logic elements stored in business rule object repository 208. Similarly, the user may then select the variable "Review Type" via user interface element 812 as an action performed or result required by the business rule when the input conditions are satisfied. The variable "Review Type" may also be associated with a respective data object (e.g., "Rev_Typ( )") or another program logic element stored in business rule object repository 208.

The user may also input values for the variables selected as input conditions using interface elements 808-812 by providing input to corresponding cells 814 of decision table interface 806. For example, the user may provide input to respective cells 814 selecting "Corporation" and "LLP" as values for the first input condition ("Enterprise Type"). The user may also use cells 814 to input or select "<$10,000" and ">=$10,000" as values for the second input condition ("Transaction Amount") with respect to the enterprise type of "Corporation." The user may also use cells 814 to input or select "<$5,250" and ">=$5,250" as values for the second input condition ("Transaction Amount") with respect to the enterprise type of "LLP." For the enterprise type of "Corporation," the user may further provide input to cells 814 selecting "None" and "Management Review" as values for the action required by the business rule with respect to the selected transaction values of "<$10,000" and ">=$10,000," respectively. Further, for the enterprise type of "LLP," the user may select "None" and "Partner Review" as values for the action required by the business rule with respect to the selected transaction values of "<$5,250" and ">=$5,250," respectively. Accordingly, the example of decision table interface 806 illustrates a rule whereby corporate transactions of at least $10,000 must be reviewed by management, all corporate transaction of less than $10,000 need not be reviewed, all LLP transactions of at least $5,250 must be reviewed by a partner, and all LLP transactions of less than $5,250 need not be reviewed.

In one embodiment, the various items available for the user's selection or entry as variables via user interface elements 808-812 may depend upon information contained in business rule object repository 208 (FIG. 2). For example, upon the user selecting or otherwise moving input focus to user interface elements 808 and 810, application creation tool 202 may access business rule object repository 208. Application creation tool 202 may then identify any data objects, parameters, variables, or other program logic elements in business rule object repository 208 available as input conditions for a business rule. Application creation tool 202 may then display a list of the identified available input items for the user's selection via input condition user interface elements 808 and 810 (e.g., populate drop-down menus with the available input items for the user's selection).

Similarly, when the user selects or otherwise moves input focus to action user interface element 812, application creation tool 202 may access business rule object repository 208. Application creation tool 202 may then identify any objects, parameters, variables, or other program logic elements in business rule object repository 208 as available results or actions associated with business rules. Application creation tool 202 may then display a list of the identified available business rule results or actions for the user's selection via action user interface element 812 (e.g., populate a drop-down menu with the available business rule actions for the user's selection). In one aspect, decision table interface 806 may also allow the user to input or modify the text descriptions of the variables displayed in user interface elements 808-812.

In some embodiments, application creation tool 202 may "clean up" or otherwise modify the names of the data objects, parameters, variables, or other program logic elements displayed by user interface elements 808-812 and/or by cells 814. For example, certain data objects stored in business rule object repository 208 may have rather technical names for use in program logic or code. These technical names may not be very useful to a business user in searching for a desired business rule. Accordingly, in one embodiment, application creation tool 202 may convert these technical names into more user-friendly or recognizable names for use in searching for and identifying a desired business rule, as discussed below. For example, referring to FIG. 5, application creation tool 202 may convert the technical data object name 526 "Trans_AMT( )" to the plain text name 528 "Transaction Amount," for use in text string representation 500, to facilitate efficient searching for the "Financial Transaction Review Type" business rule.

After creating or editing the business rule using business rule creation window 802, the user may define additional properties or attributes of the business rule using business rule property definition window 804. As shown in FIG. 8, window 804 may include a plurality of user interface elements 816-842 for classifying and defining the additional properties or attributes of the business rule. User interlace elements 816-842 may comprise, for example, drop-down menus, text entry areas, or any other user interface elements known in the art.

In one embodiment, user interface elements 816-840 may correspond to one or more of metadata items 302-326 discussed above in connection with FIG. 3. Alternatively or additionally, user interface elements 816-840 may correspond to one more of the elements contained in business rule text string representation 500 (FIG. 5), discussed above. In one embodiment, user interface elements 816-840 may respectively allow the user to select or otherwise enter: a name of the business rule (e.g., "Transaction Review"); a business rule catalog to which the business rule belongs (e.g., "XYZ Corp"); a business ruleset to which the business rule belongs (e.g., "Financial Transactions"); a function, application, or other object that executes or otherwise associates with the business rule (e.g., "MortgageApp( )"); a variable type or definition for the business rule (e.g., "Decision Table"); a field of use of the business rule (e.g., "Finance"); a status of the business rule (e.g., "Active"); a version of the business rule (e.g., "2B"); a level of authorization required to access or otherwise use the business rule (e.g., "Administrator"); an input object corresponding to an input condition of the business rule (e.g., "Transaction Amount"); and an output object corresponding to a result or action of the business rule (e.g., "Review Type"). Business rule property definition window 804 may further include a user interface element 842 allowing the user to input a description, comments, or other desired documentation associated with the business rule.

In one embodiment, the various items available for the user's selection or entry via user interface elements 816-840 may depend upon information contained in business rule object repository 208 (FIG. 2). For example, upon the user selecting or otherwise moving input focus to any of user interface elements 816-840, application creation tool 202 may access business rule object repository 208. Application creation tool 202 may then identify any items available for the selected user interface element 816-840. Application creation tool 202 may then display a list of the identified available items via the selected user interface element 816-840 (e.g., populate a drop-down menu with the available meta data selections). For example, when the user selects user interface item 820 (e.g., a drop-down menu), application creation tool 202 may identify in business rule object repository 208 all available objects or other selections corresponding to the item "Rule Set," and may display these available selections to the user in the drop-down menu for selection.

As shown in FIG. 8, business rule creation GUI 800 may further include an option 844 to save the created or edited business rule. In one embodiment, upon the user saving the business rule, application creation tool 202 may generate program code 328 (FIG. 3) for the business rule based on the user's input to business rule creation window 802 (e.g., information input to decision table interface 806). Application creation tool 202 may further generate metadata information 302-326 (FIG. 3) for the business rule, for example, based on the user's input to user interface elements 816-842 of business rule property definition window 804.

In addition, selection of save option 844 may cause application creation tool 202 to generate a text string representation for the business rule to enable searching for and/or identifying the business rule among other business rules via a text or keyword search. For example, as the exemplary business rule of FIG. 8 was created using decision table interface 806, application creation tool 202 may generate a text string representation similar to the decision table text string representation 500 discussed above in connection with FIG. 5. In one embodiment, application creation tool 202 may extract or otherwise identify the textual data associated with the attributes of the business rule displayed by decision table interface 806. For example, application creation tool 202 may extract the text names and/or values displayed in user interface elements 808-812 and/or in cells 814 (i.e., associated with the various columns and cells 814 of decision table interface 806). Optionally, application creation tool 202 may also extract or otherwise identify the textual data entered by the user via interface elements 816-842.

Application creation tool 202 may then generate a decision table text string representation 500 (e.g., a text document) containing this extracted information. For example, application creation tool 202 may generate a text string representation 500 containing corresponding business rule name information 502, business rule object information 506, business rule type information 512, business rule description 515 or comments, a column definition section 518, and/or a content definition section 530, as described above in connection with FIG. 5. In one embodiment, application creation tool 202 may generate the text string representation 500 by using the "TO_STRING" function (e.g., of C++ or Java) on the extracted information.

It is to be appreciated that, in other embodiments, decision table interface 806 may be replaced with a decision tree interface (not shown) or a formula interface for creating a business rule. In such embodiments, instead of generating a decision table text string representation 500, application creation tool 202 may generate a decision tree text string representation 600 (FIG. 6) or a formula text string representation 700 (FIG. 7) of the business rule, respectively, as discussed above.

Application creation tool 202 may then associate the generated text string representation and the metadata information 302-326 with the program code 328 of the business rule, and may store the associated information in business rule repository 206 for keyword searching. Subsequently, the business rule 300 (FIG. 3) may be searched for and/or identified among other business rules in business rule repository 206 based on a keyword search of the text string representation 330 (FIG. 3) of the business rule. For example, a user may enter the search string "column 1 transaction amount" to search for and identify the "Financial Transaction Review Type" business rule 400 (FIG. 5). Similarly, the user may enter the search string "decision 2 past due amount" to identify the "Past Due Customer" business rule 400 (FIG. 4).

Figure 9:
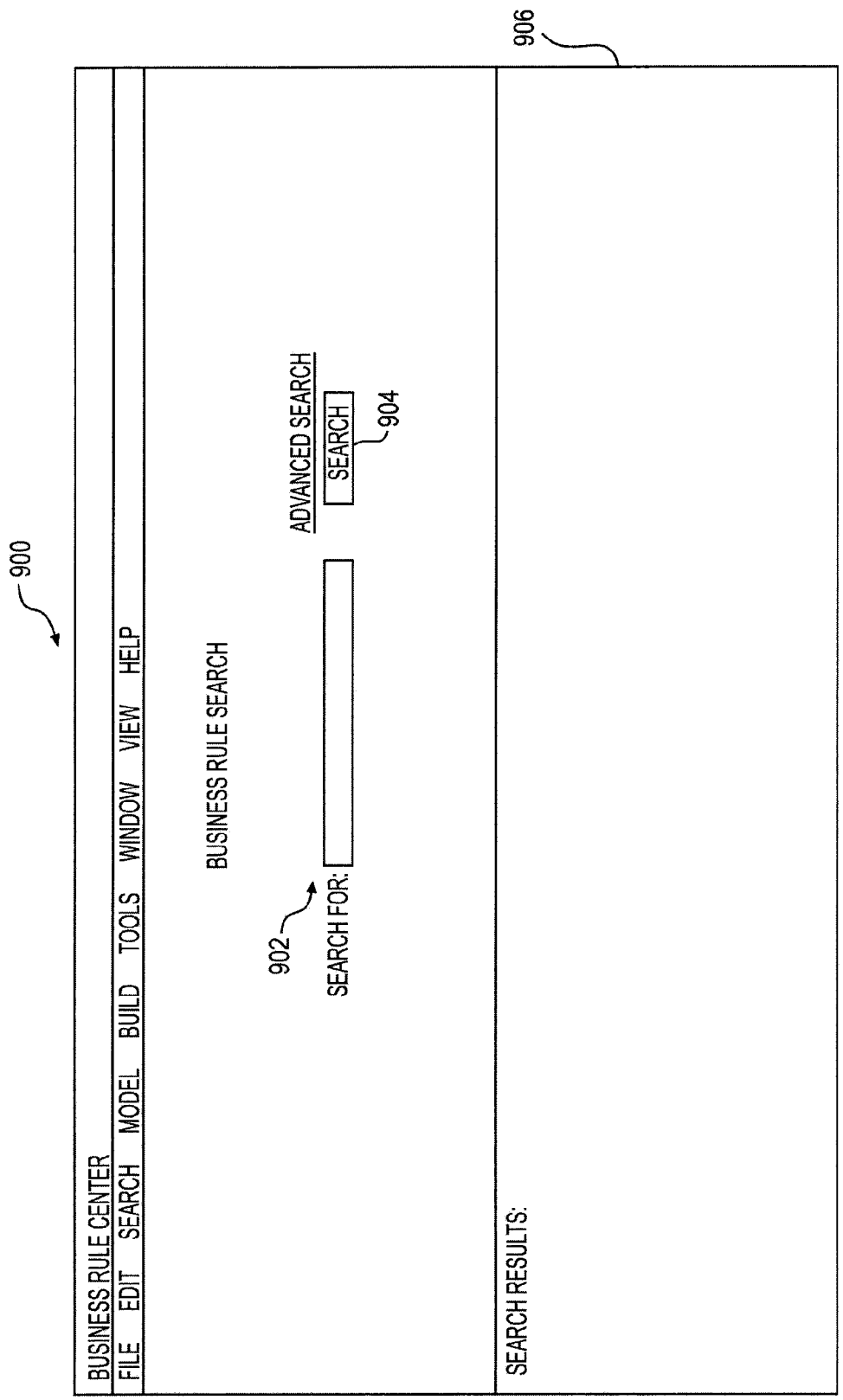
FIG. 9 is a representation of an exemplary business rule search GUI, consistent with the disclosed embodiments.

FIG. 9 is a representation of an exemplary business rule search GUI 900 associated with application creation tool 202, consistent with the disclosed embodiments. Business rule search GUI 900 may be a keyword-based search interface allowing a user to search for a business rule of interest by entering keywords or other search terms into a search entry field 902, as described above. For example, upon entering one or more search terms into a data entry field 902 and selecting search button 904, business rule search GUI 900 may generate and send a search request to business rule search engine 214 (FIG. 2). Business rule search engine 214 may then search business rule repository 206 based on the search terms and return the results of the search (i.e., relevant business rules identified in the search) to application creation tool 202 for display to the user in a search results section 906 of business rule search GUI 900. In one embodiment, business rule search engine 214 may search the rule text string representations 330 of the business rules 300 contained in business rule repository 206 to identify business rules relevant to the search. Alternatively or additionally, business rule search engine 214 may sort the search results based on relevance or other criteria known in the art, and return the sorted results to application creation tool 202 for display to the user in search results section 906. In one embodiment, business rule search engine 214 may use a ranking algorithm to rank or cluster the search results based on, for example, the number of items identified in the text string representations 330 of the business rules corresponding to the search terms entered by the user.

Search results section 906 may list the sorted search results including, for example, additional information about the business rules 300 determined from the associated metadata information 302-326 (e.g., name, catalog, rule set, field of use, related objects, etc.). Search results section 906 may also provide a link (not shown) allowing the user to download a desired business rule listed in the search results from business rule repository 206. In addition, search results section 906 may provide a link (not shown) allowing the user to view the program code or logic of the business rules 300 listed in the search results. Search results section 906 may also provide an option to download related objects (e.g., program modules) associated with the business rules 300 listed in the search results.

Figure 10:
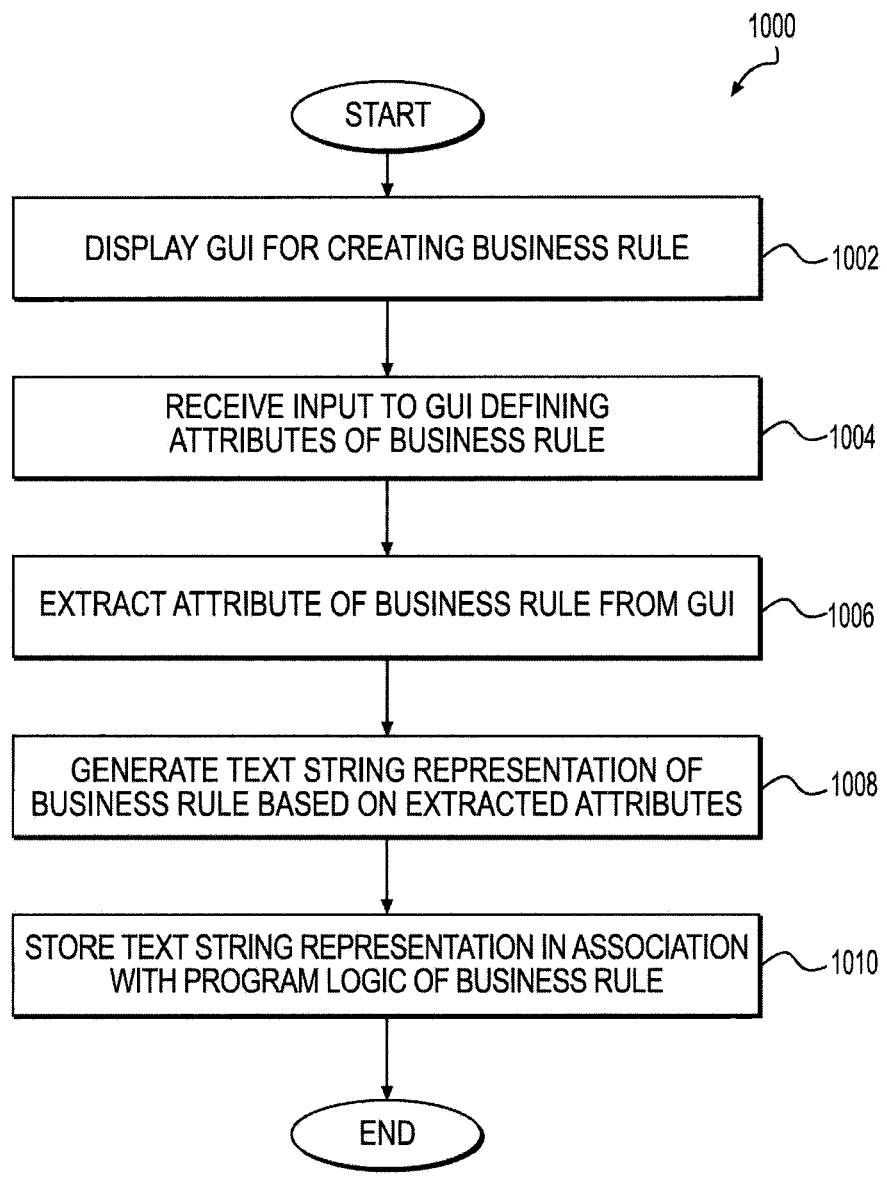
FIG. 10 is a representation of an exemplary process for generating a text string representation of a business rule, consistent with the disclosed embodiments.

FIG. 10 is a representation of an exemplary process 1000 for generating a text string representation of a business rule, consistent with the disclosed embodiments. In one embodiment, process 1000 may be a computer-implemented process performed front-end system 102 (e.g., by processor 108) executing application creation tool 202.

In step 1002, front-end system 102 may display a graphical user interface (GUI) for creating a business rule. For example, in one embodiment, front-end system 102, executing application creation tool 202, may display decision table interface 806 of GUI 800 (FIG. 8) to a business user for creating and/or editing a business rule.

In step 1004, front-end system 102 may receive input to the GUI defining attributes of the business rule. For example, the business user may use decision table interface 806 to input various attributes of the business rule via user interface elements 808-812 and/or cells 814, as discussed above. In addition, application creation tool 202 may receive input to user interface elements 816-842 for defining additional properties or attributes of the business rule.

In step 1006, application creation tool 202 may extract the attributes of the business rule from the GUI. For example, application creation tool 202 may extract the textual data displayed by user interface elements 808-812, cells 814, and user interface elements 816-842, as discussed above. In addition, in step 1006, application creation tool 202 may "clean up" or otherwise convert the names of any data objects, parameters, variables, or other program logic elements extracted from user interface elements 808-812, cells 814, and/or user interface elements 816-842 into less technical, more user-friendly or recognizable names for use in searching for and identifying a desired business rule, as discussed above.

In step 1008, application creation tool 202 may generate a text string representation of the business rule based on the attributes extracted in step 1006, as described above. For example, in one embodiment, application creation tool 202 may use the "TO_STRING" function (e.g., of C++ or Java) on the extracted attributes to generate the text string representation. Then in step 1010, application creation tool 202 may store the text string representation of the business rule in associated with program code or logic of the business rule, such as in business rule repository 206, to facilitate keyword searching and identification of the business rule.

The disclosed embodiments may be useful in any application development scenario involving business rules or other program logic components. By storing a text string representation (e.g., a text document) containing various attributes of the business rules in a business rule repository and providing a search engine for searching the text string representations of the business rules stored in the business rule repository, an application developer or business user may quickly and easily identify a desired business rule using a keyword search. For example, to search for and identify the "Past Due Customer Handing" business rule discussed above in connection with FIG. 4, the business user may enter the search string "customer treatment," "time as a customer," "past due amount," or another string based on the information contained in text string representation 600

The disclose embodiments may be advantageous in situations where the developer or business user has a general idea of the types of business rules that may be suitable for a particular situation, but does not know offhand exactly which business rule is most appropriate. For example, the developer or business user may not know the particular name of the rule, unique ID of the rule, catalog or rule set that contains the rule, and/or other information necessary for specifically identifying the business rule. Also, the developer or business user may not be familiar with the manner in which the business rule repository is organized. Accordingly, even if the developer or business user has a particular business rule in mind, he may still have difficulty identifying the business rule in the repository.

In such situations, using the disclosed embodiments, the developer or business user may simply request a keyword search of the business rule repository to identify any business rules that may be relevant to the particular application, and review the search results to identify the best business rule for the job. Moreover, because the text string representations of the business rules may contain information about the business rules from a variety of sources, the developer or business user may execute a keyword search based on any knowledge he has about a particular business rule, without regard to the specific manner in which the business rule is catalogued or organized in the business rule repository. The disclosed embodiments may also assist a business user unskilled in application programming and development to search for and identify a desired business rule. That is, the disclosed embodiments may provide a business rule search engine that is transparent to business users.

Although the present disclosure has been described primarily as applying to business rules, one of ordinary skill in the art will understand that the disclosed principles are equally applicable to any other types of program logic components or objects (i.e., program logic components unassociated with the rules of a particular business enterprise). Specifically, the disclosed techniques may be used to create text string representations of, and to provide a search engine for, any type of program logic component associated with any type of application (e.g., video games, software drivers, computer desktop applications, webpage applications, etc.), not only business rules tied to an application of a particular business enterprise. That is, the disclose concepts may help a user to identify desired program logic in a variety of different situations.

One of ordinary skill in the art will appreciate that computer programs for implementing the disclosure may be stored on and/or read from computer-readable storage media. The computer-readable storage media may have stored thereon computer-executable instructions which, when executed by a computer, cause the computer to perform, among other things, the processes disclosed herein. Exemplary computer-readable storage media may include magnetic storage devices, such as a hard disk, a floppy disk, magnetic tape, or another magnetic storage device known in the art; optical storage devices, such as CD-ROM, DVD-ROM, or another optical storage device known in the art; and/or electronic storage devices, such as EPROM, a flash drive, or another integrated circuit storage device known in the art. The computer-readable storage media may be embodied by or in one or more components of business rule application system 100 (FIG. 1).

While illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosures. The limitations in the claims are to be interpreted broadly based on the language employed in the claims and not limited by examples described in the present specification or during the prosecution of the application. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A method for providing a business rule repository in a memory, comprising:
    displaying, on a display device, a graphical user interface (GUI) for creating a business rule;
    receiving, in a computer, via the GUI:
        user input relating to an input variable of the business rule; and
        user input relating to an action required by the business rule based on the input variable;
    generating program logic for the business rule, based on the input, the program logic comprising groups of text characters forming non-human-language words;
    generating, by the computer, a text string representation of the business rule based on the program logic,
        such that the non-human-lanquage words are replaced with human-language words in the text string representation; and
    storing the text string representation in association with the program logic for the business rule, in the business rule repository, such that the business rule may be identified via a search based on the text string representation.

2. The method of claim 1, wherein the GUI comprises a decision table interface for creating the business rule, the decision table interface including a first column associated with the input variable of the business rule and a second column associated with the action required by the business rule.

3. The method of claim 2, wherein receiving the input comprises:
    receiving a selection of a data object corresponding to the input variable of the business rule to assign to the first column; and
    receiving a selection of a data object corresponding to the action required by the business rule to assign to the second column.

4. The method of claim 3, wherein receiving the input further comprises:
    receiving input of a value for the input variable of the business rule to a cell of the first column; and
    receiving input of a value for the action required by the business rule to a cell of the second column.

5. The method of claim 4, wherein the text string representation contains at least one of:
    a name of the data object assigned to the first column;
    the value for the input variable of the business rule;
    a name of the data object assigned to the second column; and
    the value for the action required by the business rule.

6. The method of claim 5, wherein the text string representation further contains at least one of:
    a first column identifier associating the first column with the name of the data object assigned to the first column;
    a second column identifier associating the second column with the name of the data object assigned to the second column;
    a first row identifier associating the value for the input variable of the business rule with the cell of the first column; and
    a second row identifier associating the value for the action required by the business rule with the cell of the second column.

7. The method of claim 6, wherein the business rule repository contains text string representations of a plurality of business rules, and the method further comprises:
    receiving a keyword-based search request;
    searching the text string representations of the plurality of business rules based on the search request; and
    outputting results of the search.

8. The method of claim 1, wherein the text string representation contains at least one of a name of the business rule, a name of a data object associated with the business rule, and a type of the business rule.

9. A non-transitory, computer-readable storage medium storing computer program instructions which, when executed by a computer, cause the computer to perform a method for providing a business rule repository in a memory, the method comprising:
- displaying, on a display device, a graphical user interface (GUI) for creating a business rule;
- receiving, via the GUI:
  - user input relating to an input variable of the business rule; and
  - user input relating to an action required by the business rule based on the input variable;
- generating program logic for the business rule, based on the input, the program logic comprising groups of text characters forming non-human-language words;
- generating a text string representation of the business rule based on the program logic,
  - such that the non-human-language words are replaced with human-language words in the text string representation; and
- storing the text string representation in association with the program logic for the business rule, in the business rule repository, such that the business rule may be identified via a search based on the text string representation.

10. The non-transitory, computer-readable medium of claim 9, wherein the GUI comprises a decision table interface for creating the business rule, the decision table interface including a first column associated with the input variable of the business rule and a second column associated with the action required by the business rule.

11. The non-transitory, computer-readable medium of claim 10, wherein receiving the input comprises:
- receiving a selection of a data object corresponding to the input variable of the business rule to assign to the first column; and
- receiving a selection of a data object corresponding to the action required by the business rule to assign to the second column.

12. The non-transitory, computer-readable medium of claim 11, wherein receiving the input further comprises:
- receiving input of a value for the input variable of the business rule to a cell of the first column; and
- receiving input of a value for the action required by the business rule to a cell of the second column.

13. The non-transitory, computer-readable medium of claim 12, wherein the text string representation contains at least one of:
- a name of the data object assigned to the first column;
- the value for the input variable of the business rule;
- a name of the data object assigned to the second column; and
- the value for the action required by the business rule.

14. The non-transitory, computer-readable medium of claim 13, wherein the text string representation further contains at least one of:
- a first column identifier associating the first column with the name of the data object assigned to the first column;
- a second column identifier associating the second column with the name of the data object assigned to the second column;
- a first row identifier associating the value for the input variable of the business rule with the cell of the first column; and
- a second row identifier associating the value for the action required by the business rule with the cell of the second column.

15. The non-transitory, computer-readable medium of claim 14, wherein the business rule repository contains text string representations of a plurality of business rules, and the method further comprises:
- receiving a keyword-based search request;
- searching the text string representations of the plurality of business rules based on the search request; and
- outputting results of the search.

16. The non-transitory, computer-readable medium of claim 9, wherein the text string representation contains at least one of a name of the business rule, a name of a data object associated with the business rule, and a type of the business rule.

17. A computer system for providing a business rule repository, the system comprising:
- a display device;
- a memory storing a program logic repository;
- a user input device for receiving input from a user; and
- a processor configured to:
  - display, via the display device, a graphical user interlace (GUI) for creating a business rule;
  - receive, via the input device:
    - user input to the GUI relating to an input variable of the business rule; and
    - user input relating to an action required by the business rule based on the input variable;
  - generate program logic for the business rule, based on the input, the program logic comprising groups of text characters forming non-human-language words;
  - generate a text string representation of the business rule based on the program logic,
    - such that the non-human-language words are replaced with human-language words in the text string representation; and
  - store the text string representation in association with the program logic for the business rule, in the business rule repository, such that the business rule may be identified via a search based on the text string representation.

18. The computer system of claim 17, wherein the GUI comprises a decision table interface for creating the business rule, the decision table interface including a first column associated with the input variable of the business rule and a second column associated with the action required by the business rule.

19. The computer system of claim 18, wherein the input comprises:
- a selection of a data object corresponding to the input variable of the business rule to assign to the first column;
- a selection of a data object corresponding to the action required by the business rule to assign to the second column;
- an input of a value for the input variable of the business rule to a cell of the first column; and
- an input of a value for the action required by the business rule to a cell of the second column.

20. The computer system of claim 19, wherein the text string representation contains at least one of:
- a name of the data object assigned to the first column;
- the value for the input variable of the business rule;
- a name of the data object assigned to the second column;
- the value for the action required by the business rule;
- a first column identifier associating the first column with the name of the data object assigned to the first column;
- a second column identifier associating the second column with the name of the data object assigned to the second column;

a first row identifier associating the value for the input variable of the business rule with the cell of the first column; and a second row identifier associating the value for the action required by the business rule with the cell of the second column.

21. The computer system of claim 17, wherein the text string representation contains at least one of a name of the business rule, a data object associated with the business rule, and a type of the business rule.

* * * * *